United States Patent [19]

Nusinov et al.

[11] Patent Number: 5,053,951
[45] Date of Patent: Oct. 1, 1991

[54] SEGMENT DESCRIPTOR UNIT FOR PERFORMING STATIC AND DYNAMIC ADDRESS TRANSLATION OPERATIONS

[75] Inventors: Eugene Nusinov, Sharon; Thomas F. Joyce, Westford, both of Mass.

[73] Assignee: Bull HN Information Systems Inc., Billerica, Mass.

[21] Appl. No.: 331,054

[22] Filed: Mar. 28, 1989

Related U.S. Application Data

[63] Continuation of Ser. No. 947,315, Dec. 23, 1986, abandoned.

[51] Int. Cl.$^5$ .................. G06F 9/00; G06F 12/10; G06F 12/14
[52] U.S. Cl. .................. 364/200; 364/253; 364/254.2; 364/255.7; 364/256.5; 364/955; 364/956; 364/957.1; 364/959
[58] Field of Search ... 364/200 MS File, 900 MS File

[56] References Cited

U.S. PATENT DOCUMENTS

| | | | |
|---|---|---|---|
| 3,518,631 | 6/1970 | Lindquist et al. | 365/230 |
| 3,800,286 | 3/1974 | Brown et al. | 364/200 |
| 3,916,385 | 10/1975 | Parmar et al. | 364/200 |
| 3,938,096 | 2/1976 | Brown et al. | 364/200 |
| 4,084,226 | 4/1978 | Anderson et al. | 364/200 |
| 4,385,352 | 3/1983 | Bienvenu | 364/200 |
| 4,692,900 | 9/1987 | Ooami et al. | 365/230 |
| 4,771,404 | 9/1988 | Mano et al. | 365/189 |

OTHER PUBLICATIONS

John Hennessy, "VLSI Processor Architecture", IEEE Transaction on Computer, vol. C-33, No. 12, Dec. 1984.

Primary Examiner—Thomas C. Lee
Assistant Examiner—Ayni Mohamed
Attorney, Agent, or Firm—Faith F. Driscoll; John S. Solakian

[57] ABSTRACT

A segment descriptor unit (SDU) includes a divided random access memory (RAM), a content addressable memory (CAM) and decoder circuits interconnected for performing dynamic and static address translation operations within a minimum of chip area and power. The CAM is arranged to store a number of entries which include segment number and validity information associated with a corresponding number of segment descriptors. The RAM contains locations allocated for storing segment descriptor words (SDW's) and working data. Each SDW is logically divided into two fields, a static translation word (STW) field containing all of the bits required for performing a static address translation operation and an access control word (ACW) field containing all of the bits required for verifying compliance with system security. The bits of each STW and ACW are stored in alternate bit positions of the SDW locations. Each pair of RAM bit locations couple to a common read/write amplifier and multiplexer circuit. Through the use of microinstruction commands coded to specify different address translation functions, the STW and ACW fields selected by the CAM are read out from RAM during different intervals for carrying out the steps of those operations.

22 Claims, 11 Drawing Sheets

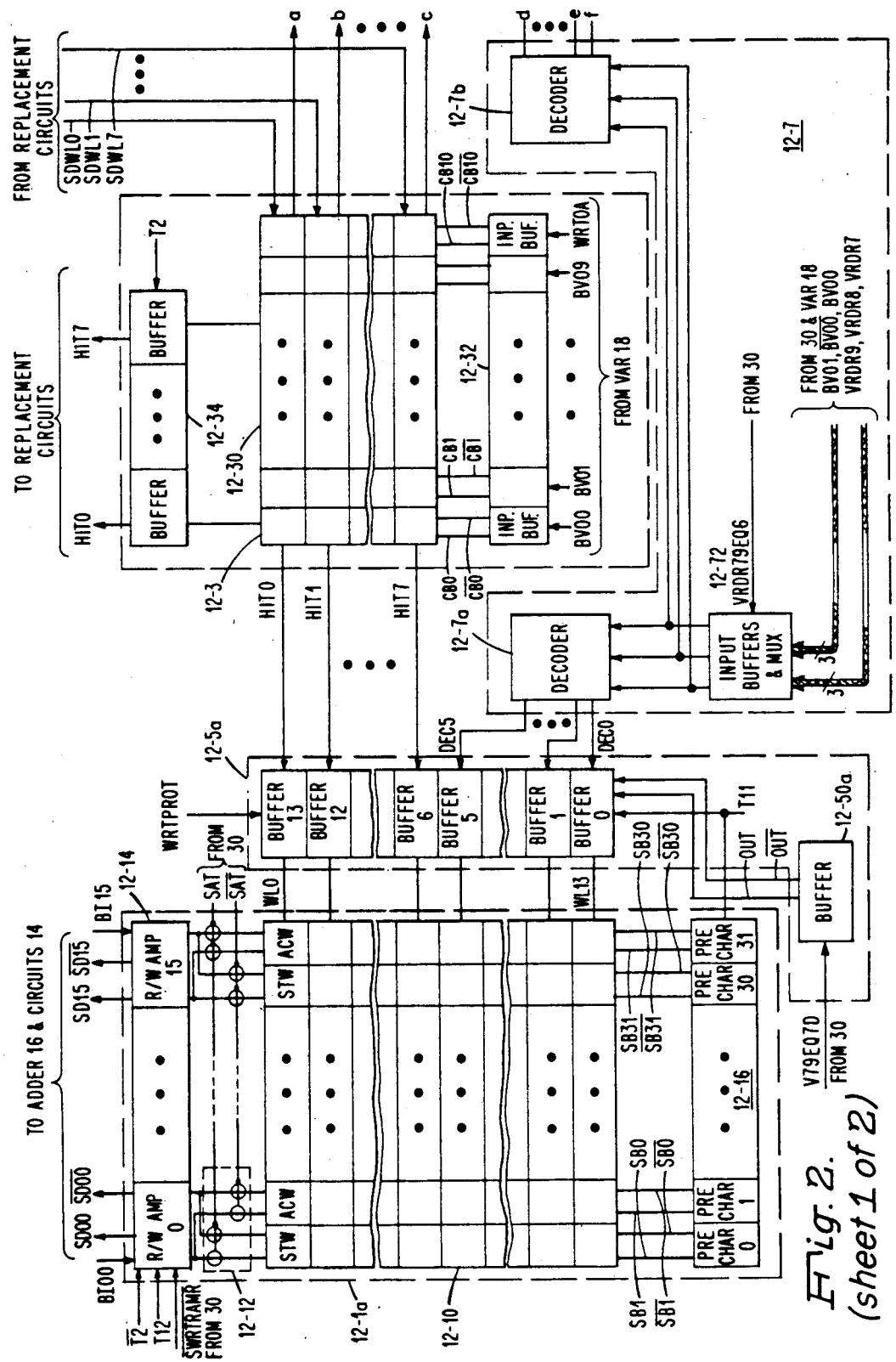
Fig. 2. (sheet 1 of 2)

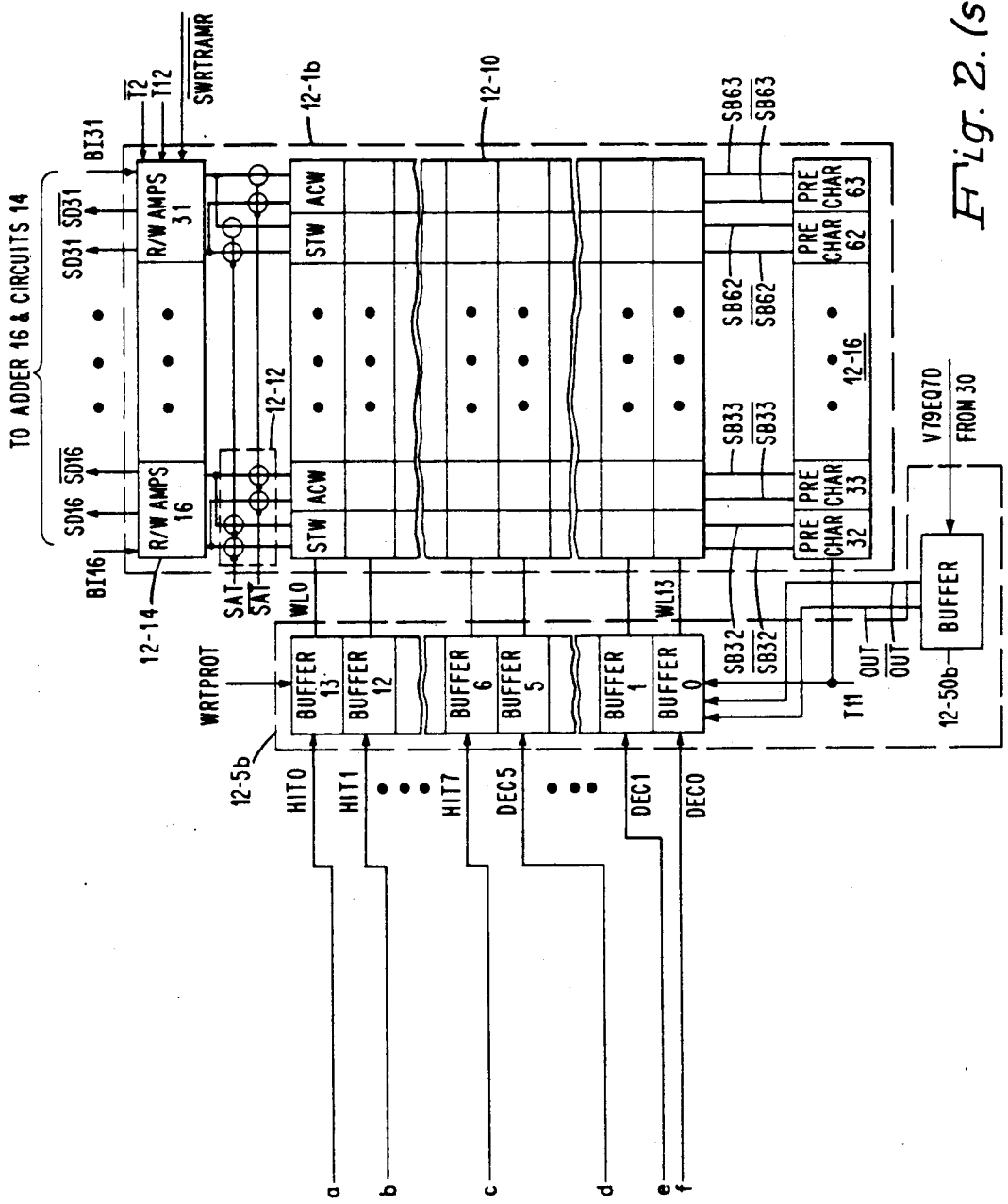
Fig. 2. (sheet 2 of 2)

MAP OF REGISTER ASSIGNMENTS

| 28 LOCATIONS | | |
|---|---|---|
| DECIMAL | HEX | CONTENTS |
| 1 | 0 | WORK REGISTER 0 |
| 2 | 1 | WORK REGISTER 1 |
| 3 | 2 | WORK REGISTER 2 |
| 4 | 3 | WORK REGISTER 3 |
| 5 | 4 | WORK REGISTER 4 |
| 6 | 5 | WORK REGISTER 5 |
| 7 | 6 | DSBR UPPER |
| 8 | 7 | DSBR LOWER |
| 9 | 8 | STATIC TRANSLATION WORD 0 |
| 10 | 9 | STATIC TRANSLATION WORD 1 |
| 11 | A | STATIC TRANSLATION WORD 2 |
| 12 | B | STATIC TRANSLATION WORD 3 |
| 13 | C | STATIC TRANSLATION WORD 4 |
| 14 | D | STATIC TRANSLATION WORD 5 |
| 15 | E | STATIC TRANSLATION WORD 6 |
| 16 | F | STATIC TRANSLATION WORD 7 |
| 17 | 10 | DSPT 0 |
| 18 | 11 | DSPT 1 |
| 19 | 12 | DSPT 2 |
| 20 | 13 | DSPT 3 |
| 21 | 14 | ACCESS CONTROL WORD 0 |
| 22 | 15 | ACCESS CONTROL WORD 1 |
| 23 | 16 | ACCESS CONTROL WORD 2 |
| 24 | 17 | ACCESS CONTROL WORD 3 |
| 25 | 18 | ACCESS CONTROL WORD 4 |
| 26 | 19 | ACCESS CONTROL WORD 5 |
| 27 | 20 | ACCESS CONTROL WORD 6 |
| 28 | 21 | ACCESS CONTROL WORD 7 |

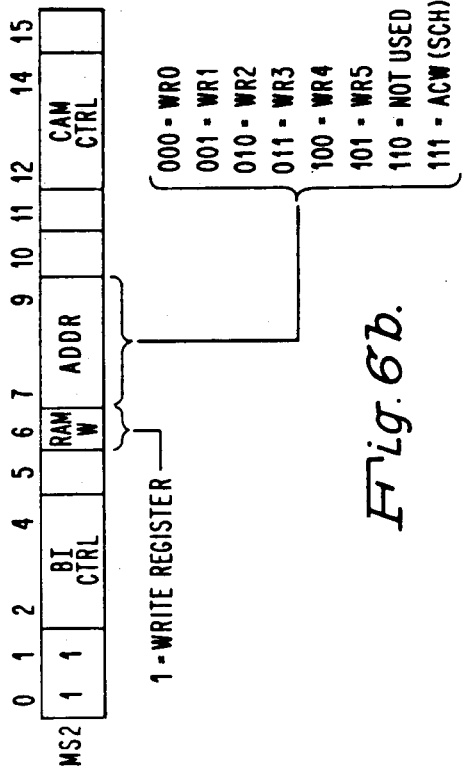
Fig. 6b.
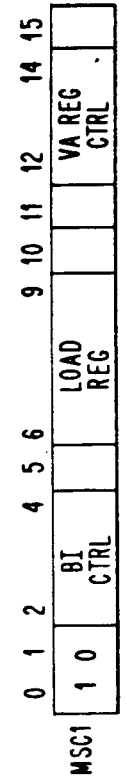
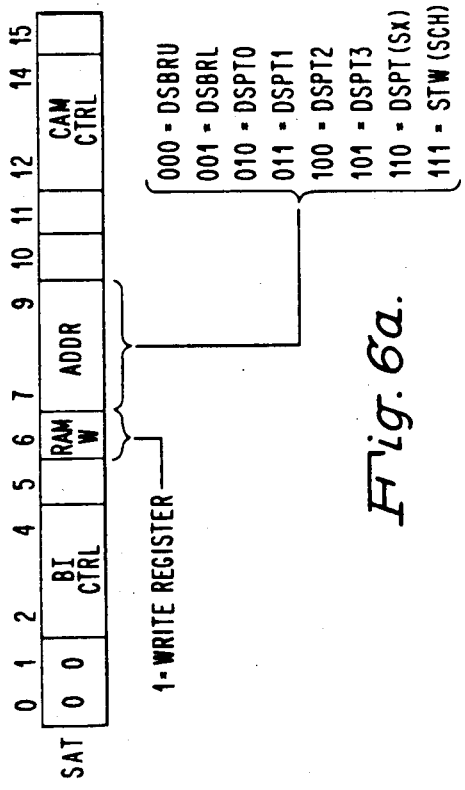
Fig. 6a.
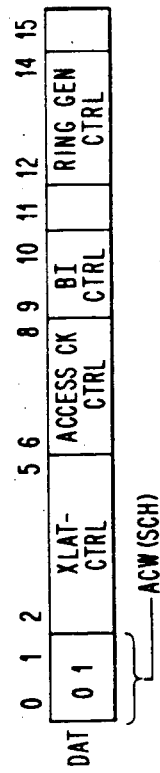
Fig. 6c.
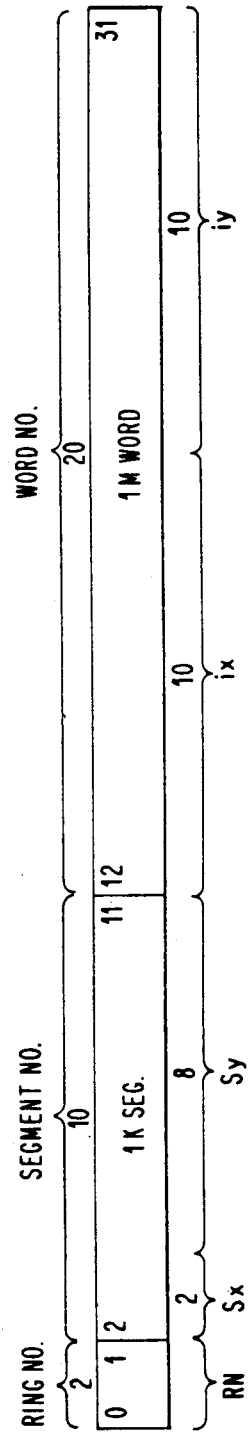
Fig. 6d.
Fig. 6e.

SEGMENT DESCRIPTOR UNIT FOR PERFORMING STATIC AND DYNAMIC ADDRESS TRANSLATION OPERATIONS

This is a continuation of application Ser. No. 947,315, filed on Dec. 23, 1986, now abandoned.

RELATED PATENT APPLICATIONS

1. The patent application of Thomas F. Joyce, Eugene Nusinov and Richard P. Brown entitled, "High Speed High Density Dynamic Address Translator", which issued as U.S. Pat. No. 4,813,002 on Mar. 14, 1989, which is assigned to the same assignee as this patent application.

2. The patent application of Richard P. Kelly and Thomas F. Joyce entitled, "Distributed Control Store word", which issued as U.S. Pat. No. 4,670,835 on June 2, 1987 and which is assigned to the same assignee as this patent application.

BACKGROUND OF THE INVENTION

1. Field of Use

This invention pertains to storage apparatus and more particularly to storage apparatus used for processing segment descriptor information.

2. Prior Art

Today, many systems employ a combination of paging and segmentation features. One of the more well known of these systems is the MULTICS system. Such systems utilize segment descriptor words, each of which contain information pointing to the page table of the segment if the segment is known to reside in memory, the size of the segment and a descriptor field containing access control information. The number of bits for a segment descriptor word is relatively large, particularly where the system memory capacity is large or sophisticated security controls are utilized. For further information about the MULTICS system, reference may be made to the text "The MULTICS System: An Examination of its Structure", by Elliott I. Organick, Copyright 1972.

In order to store and access segment descriptor words, systems have used groups of memory locations or storage registers having the requisite number of bit positions. This requires the use of pairs of RAM chips to provide the desired storage register width. While this approach is suitable for many systems, it requires too much space and consumes too much power for systems implemented using very large scale integration (VLSI) chip technology. Also, in order to utilize the segment descriptor words, additional information may also have to be stored. This can increase RAM storage requirements adding to space and power consumption.

Accordingly, it is a primary object of the present invention to provide segment descriptor storage apparatus which is simple to construct in VLSI form and requires a minimum of space.

It is another object of the present invention to provide segment descriptor storage apparatus which consumes a minimum of power.

SUMMARY OF THE INVENTION

These and other objects of the present invention are achieved in a preferred embodiment of the present invention which includes a segment descriptor unit (SDU) includes a divided random access memory (RAM), a content addressable memory (CAM) and decoder circuits interconnected for performing dynamic and static address translation operations under microprogram control within a minimum of chip area and at low power. The CAM is arranged to store a number of entries which include segment number and validity information associated with a corresponding number of segment descriptors.

The RAM contains locations allocated for storing segment descriptor words (SDW's) and working data. Each SDW is logically divided or functionally compartmentalized into two fields, a static translation word (STW) field containing all of the bits required for performing a static address translation operation and an access control word (ACW) field containing all of the bits required for verifying compliance with system security. The bits of each STW and ACW are stored in alternate bit positions of the SDW locations. Each pair of RAM bit locations couple to a common read/write amplifier and multiplexer circuit.

Under the control of microinstruction commands coded to specify different address translation functions, the STW and ACW fields selected by the CAM are read out from RAM at different intervals for carrying out the necessary steps of each such address translation operation. By way of example, in the preferred embodiment, each 64-bit segment descriptor word is written into the SDU, 32 bits at a time.

During a dynamic address operation defined by a first microinstruction command, while the page descriptor information is being read out from memory, the SDU is conditioned to read out in parallel, the ACW field of the segment descriptor specified by the hit outputs of CAM and the decode of a portion of the virtual address being translated. This permits security comparison circuits included within the SDU to verify compliance with system security requirements. In the case of a static address translation operation defined by a second microinstruction command, the SDU is conditioned to read out the STW field of the segment descriptor specified by the hit outputs of the CAM and decode of the portion of the virtual address being translated.

Input signals generated by the first and second microinstruction commands are used to determine which portion of the RAM is to be accessed as a function of the type of address translation operation being performed as specified by such commands. The STW field is transferred to an adder for formation of the translated addresses required for fetching segment descriptors from main memory or cache memory. Another microinstruction command permits access to working register locations within another area of the same RAM enabling storage of information associated with the translation functions being performed.

The arrangement of the present invention by dividing the segment descriptor word on the basis of the functions being performed eliminates the need for data path multiplexers and switches since the width of the information word being read out from RAM for transfer to either the security unit or adder matches the width of the information being processed by these units. Also, this permits the adder and security comparison circuits to be positioned adjacent to the RAM, reducing chip metalization, interconnection and space requirements. Also, the organization reduces the number of read/write amplifier circuits by one-half which produces significant savings in chip area and power consumption. Additionally, the invention permits access to the contents of a number of types of different registers all contained within a single RAM through the use of few microinstruction commands.

The novel features which are believed to be characteristic of the invention both as to its organization and method of operation, together with further objects and advantages will be better understood from the following description when considered in connection with the accompanying drawings. It is to be expressly understood, however, that each of the drawings is given for the purpose of illustration and description only and is not intended as a definition of the limits of the present invention.

DETAILED DESCRIPTION OF THE DRAWINGS

FIG. 2 is a block diagram of the memory section of the SDU of FIG. 1.

FIGS. 4a and 4b show the mapping and contents of the memory section of FIG. 2.

FIGS. 6a through 6e illustrate the control word formats and virtual address format used in explaining the operation of the SDU of FIG. 1.

DESCRIPTION OF THE PREFERRED EMBODIMENT

Figure 1:
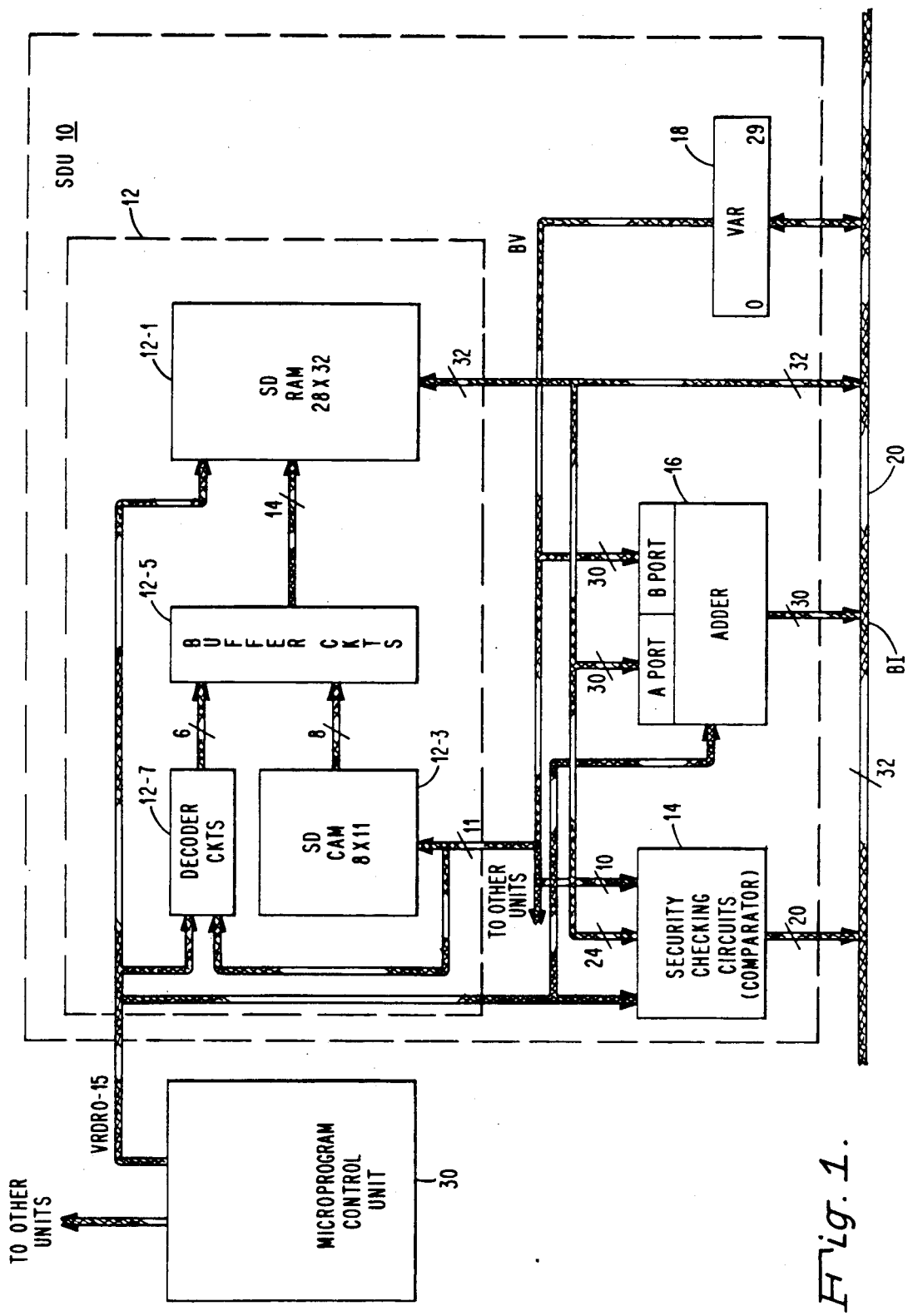
FIG. 1 is a block diagram of the segment descriptor unit (SDU) of the present invention.

FIG. 1 shows in block diagram form, the preferred embodiment of the descriptor unit (SDU) constructed according to the teachings of the present invention. As seen from the Figure, the SDU 10 includes a memory section 12, an adder 16, security checking comparison circuits 14 and a virtual address register 18. Each of the elements 12 through 18 connect to an internal bus 20 as shown. The SDU 10 operates under the control of a microprogrammed control unit 30 which it shares with the other parts of a virtual memory management unit (VMMU) of an associated central processing unit (CPU). That is, each microinstruction word is divided into a number of portions, and the portions are distributed to the SDU 10 and other parts of the CPU. As shown, SDU 10 receives 16 bits of the microinstruction word which corresponds to signals VRDR0-15. These signals are decoded by circuits, not shown, and applied as inputs. An example of such an arrangement is disclosed in the related patent application of Richard P. Kelly, et al. However, for the purposes of the present invention, unit 30 can be considered a part of SDU 10.

The memory section 12 includes a 28×32 random access memory (RAM) 12-1, a content addressable memory (CAM) 12-3, a plurality of buffer circuits 12-5 and the decoder circuits 12-7 which are arranged as shown. As explained herein, different parts of RAM 12-1 are addressed by combinations of microprogramming control signals and/or virtual address signals received from VAR register 18.

The 28×32-bit locations of RAM 12-1 store segment descriptor word entries which include 8, 32-bit static translation words (STW's), 8, 32-bit access control words (ACW's), 4, 32-bit segment page table words, a 32-bit descriptor segment base register (DSBR) upper, a 32-bit DSBR lower and 6, 32-bit working register words. The 8, 11-bit locations of CAM 12-3 store 8, 10-bit segment number words and 8, 1-bit CAM validity bits.

The operations of the SDU 10 include: (1) interrogating CAM 12-1 using a virtual segment number received from VAR register 18 and looking for the occurrence of a hit indicating that the requested segment is present; (2) signalling another part of the VMMU when a miss occurs for the segment number; (3) clearing the CAM validity bits for invalid segments; (4) validating CAM entries in response to hit signals; (5) storing the contents of working registers in RAM 12-1 as required; (6) storing page table entries in RAM 12-1 needed to locate segment descriptors, and (7) locating the page table pointed to by the DSBR when it is stored in RAM 12-1.

As described herein, the virtual address is divided into a number of fields which include a 2-bit segment number field Sx, an 8-bit segment number field Sy, a first 8-bit word number field ix and a second 8-bit word number field iy. The field ix corresponds to the page offset value relative to the segment descriptor while the field iy is the word offset value relative to the segment descriptor.

The CAM 12-3 is interrogated by concatenating the Sx and Sy fields with a validity bit to produce an 11-bit field which is applied as a data input to CAM 12-3. The eight word entries of CAM 12-3 are scanned and when there is an identical comparison, CAM 12-3 forces one of eight hit lines high.

As seen from FIG. 1, the eight hit lines are applied as inputs to the corresponding eight stages of buffer circuits 12-5. The buffer circuits 12-5 separate RAM 12-1 from CAM 12-3 and increase the drive strength of the hit line signal used to access RAM 12-1.

The eight hit line signals serve as a subaddress which is applied to the portion of RAM 12-1 which contains the ACW's or STW's. The selection of ACW's and STW's is made under microprogrammed control unit 30 as a function of the activity or operation being performed. For example, when a dynamic address translation operation is being performed while the part of the VMMU which stores the page descriptor words is being accessed, the arrangement of the present invention permits the accessing of an ACW so that access rights can be checked by the security checking circuits 14 (e.g. ring bracket and access (read, write, execute, gate), size (e.g. segment, gate). Also, during the time that an address is being located to create the address for a missing page descriptor, the invention permits access to the STW's for obtaining another page from the page table.

Thus, the arrangement permits the completion of the virtual to physical address translation including all required checking within one complete cycle of operation of microprogrammed control unit 30.

As part of the above address translation, it may be necessary to access the contents of certain work registers. This is done under microprogram control by conditioning the decoder circuits 12-7 to generate a subaddress using signals from either BI 20 or VAR 18. The 6-bit subaddress generated in response to the 3-bit signals of the selected source (i.e., BI 20 or VAR 18) is used to select one of 6, 32-bit working register locations or one of the 6, 32-bit descriptor segment register locations as a function of the particular operation being performed defined by microprogram control unit 30.

This arrangement eliminates the need to access different RAMs and provides these as inputs to the ALU in order as required to generate a new address. This results in a substantial simplification of control in terms of requiring only a CAM and decoder operated by a small number of microcommands for generating the desired static translation address and making the required access checks.

Figure 3A:
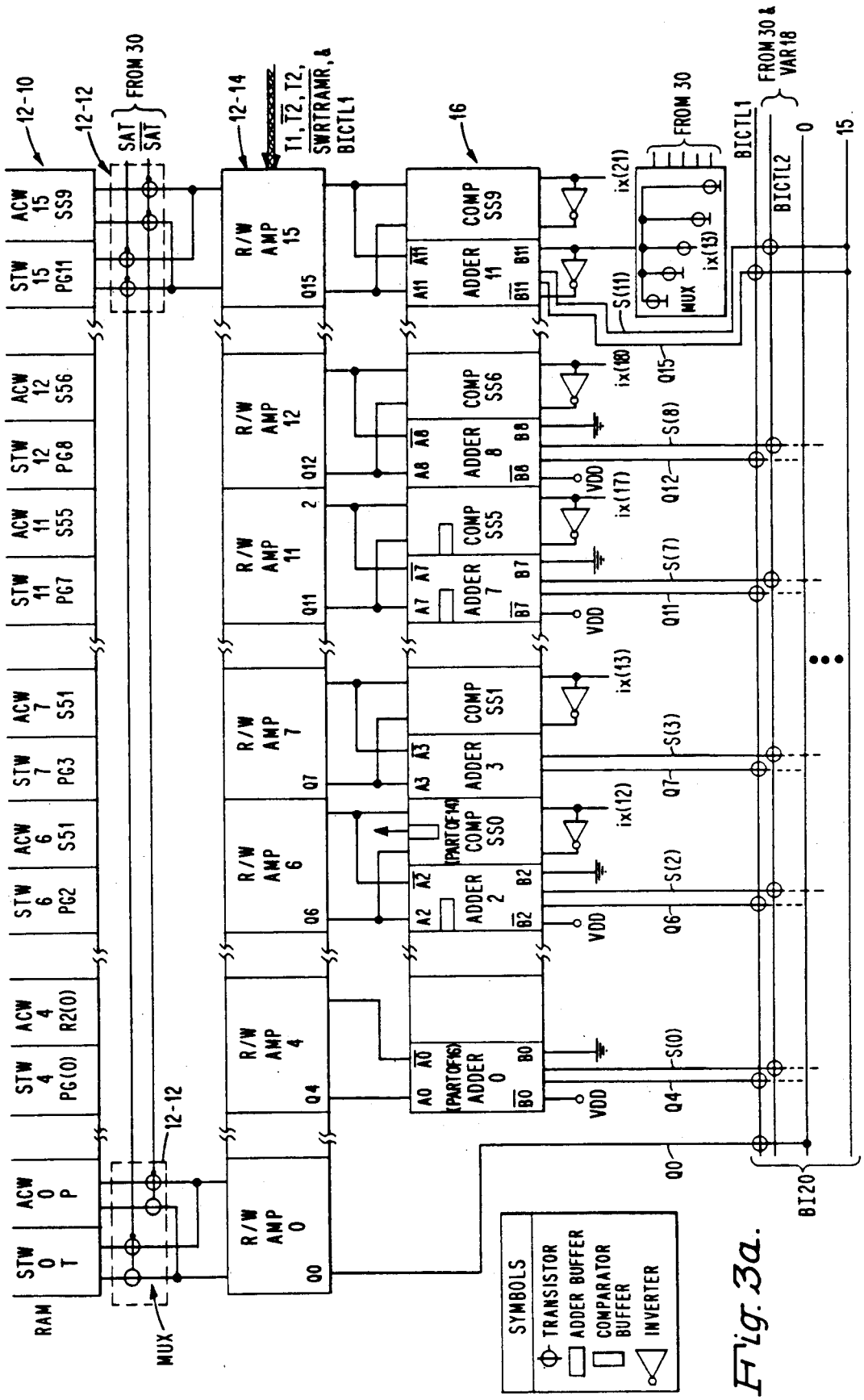
FIGS. 3a through 3g show in greater detail different parts of the memory section of FIG. 2.
Figure 4B:
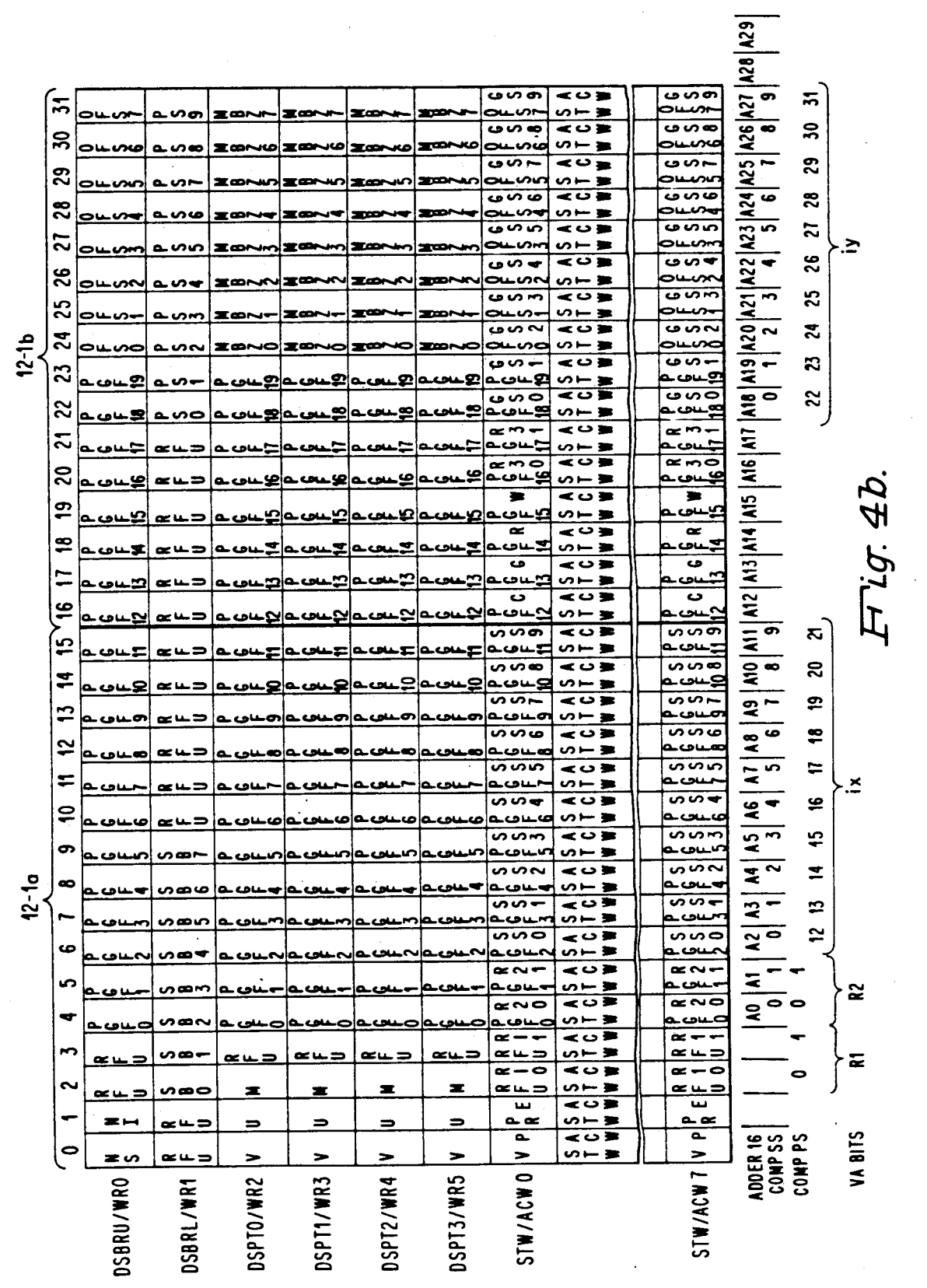

By employing the above organization, the layout of the different elements of SDU 10 is maximized for efficiency. That is, the elements of the RAM 12-1 and the adder 16 are organized into columns which minimize chip area and power consumption. Various aspects of this organization are illustrated by FIGS. 2, 3a and 4b.

MEMORY SECTION 12

FIG. 2 shows in greater detail, the organization of memory section 12 according to the teachings of the present invention. As seen from FIG. 2, RAM 12-1 of section 12 includes a pair of RAMs 12-1a and 12-1b. Each RAM includes an array of cells 12-10 organized into 14, 32 columns of bit cells, 16 multiplexer circuits 12-12, 16 read/write amplifier circuits 12-14 and 32 precharge circuits 12-16. Each RAM is separated from CAM 12-3 and decoder 12-7 by a column of 14 input buffer circuits 12-5.

Each first group of buffer circuits 6 through 13 receives input hit signals HIT0 through HIT7 from CAM 12-3. The second group of buffer circuits 0 through 5 receives decoded signals DEC0 through DEC5 from a corresponding one of the decoder circuits 12-7a and 12-7b of block 12-7. Each column of buffer circuits further includes a buffer circuit 12-50 which stores the state of an input control signal V79EQ7D generated by unit 30. Both groups of input buffer circuits can be considered conventional in design. They operate to convert the logic level input signals into high level complementary output signals. Also, the groups of buffer circuits receive a write protect signal WRTPROT from a central timing source, not shown, which is conventional in design. This signal inhibits the application of input signals to the RAM 12-1 during the time interval T1 when RAM 12-1 is being precharged.

The complementary output signals OUT and $\overline{OUT}$ respectively are applied as gating outputs to the first and second groups of buffer circuits 12-5. Additionally, the buffer circuits 12-5 and precharge circuits 12-16 receive timing signals T11 from the central timing source. The timing source also provides timing signals $\overline{T2}$ and T12 which are applied to the R/W amplifier circuits 12-14. Control signals SAT, $\overline{SAT}$ and $\overline{SWRTRAMR}$ generated under the control of microprogrammed control unit 30 are applied to multiplexer circuits 12-12 and R/W amplifier circuits 12-14 as shown. The cells of the RAMs are precharged by the precharge circuits 12-16, conventional in design, in response to timing signal T11. The information is read from and written into the RAM cells via the R/W amplifier circuits 12-14.

Each of the R/W amplifier circuits 12-14 of each RAM is shared by a different pair of columns of bit cells as shown. The signals SAT and $\overline{SAT}$ from microprogrammed control unit 30 establish which bit cells of the pairs whose contents are to be applied to the R/W amplifier circuits 12-14 by the multiplexer circuits 12-12 as explained herein.

As seen from FIG. 2, each of the decoder circuits 12-7a and 12-7b receive a set of three input signals from either unit 30 or VAR 18. These signals are applied via a multiplexer and input buffer circuits of block 12-72 as a functi. of control signal VRDR79EQ6 generated by decoding VRDR bits 7-9 received from microprogrammed control unit 30 (i.e., bits 7-9="110" or 6).

The CAM 12-3 includes an 8×11 memory array 12-30, a plurality of input buffer circuits 12-32 and a plurality of output buffer circuits 12-34. The input buffer circuits 12-32 receive virtual address signals BV00 through BV09 and validity control bit signal WRT04 from VAR 18. The state of validity control bit signal WRT0A is established by replacement circuits, not shown. When the address signals are written into CAM 12-3, the validity bit is set. The bit is updated in a conventional manner when an address word is modified.

The CAM 12-3 operates to simultaneously compare the virtual address applied to the input buffer circuits 12-32 with all of the eight segment descriptor words stored in the vertical rows or columns of the memory cells of array 12-30. When there is an identical comparison, the vertical row of cells detecting the comparison forces a hit line which connects in common to all of the cells of that vertical row to a predetermined state. CAM 12-3 applies the results of the simultaneous comparison to hit lines HIT0 through HIT7. These signals are in turn applied as inputs to corresponding horizontal rows of cells of RAM memory arrays 12-10a and 12-10b via buffer circuits 12-5a and 12-5b, respectively.

The output buffer circuits 12-34 apply the results of the comparison corresponding to the states of signals HIT0 through HIT7 to the replacement circuits. The address contents of CAM 12-3 are changed or written as a function of the states of signals SDWL0 through SDWL7 generated by the replacement circuits applied to a set of word lines. For the purpose of the present invention, the replacement circuits may be considered conventional in design. The CAM 12-3 can be initialized to store a given set of eight segment descriptor address words by successively forcing each of the eight word lines to a predetermined state.

It will be noted that CAM 12-3 provides two sets of hit lines. A first set which extends in a horizontal direction connects to RAMs 12-1a and 12-1b, and a second set which extends in a vertical direction connects to the replacement circuits which are located above CAM 12-3. This is accomplished by passing a number of lines in a orthogonal direction through each CAM cell. This arrangement allows the hit lines and word lines to be oriented in the desired directions for connecting to other sections of the VMMU chip. The result is a reduction in area, improved efficiency and performance. For further information regarding the implementation of the CAM cells, reference may be made to the related patent application of Thomas F. Joyce, et al.

FIG. 3a shows in greater detail, the organization of portions of the memory section 12, comparator circuits 14 and adder 16 for bit positions Q0 through Q15. As shown, the memory cells of array 12-10, the multiplexer circuits 12-12, the R/W amplifier circuits 12-14 and the stages of adder 16 are arranged in columns or slices as shown. The connections to bus BI 20 and the required input signals to the adder stages are made as shown. The arrangement of the preferred embodiment further minimizes chip space requirements by alternating the sections of comparator circuits 14 and stages of adder 16. The remaining bit positions Q16 through Q31 are similarly arranged according to FIG. 4b.

Figure 3B:
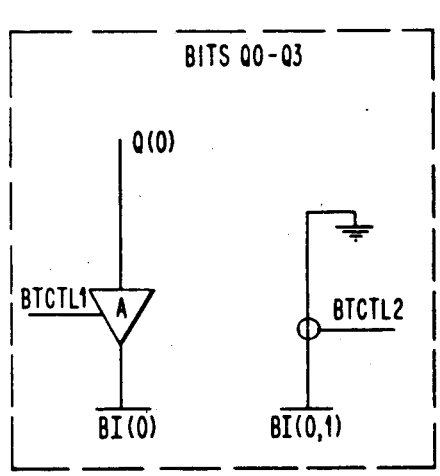

FIGS. 3b through 3f show in greater detail, the construction of the circuits which make up bit positions Q0 through Q31 of FIGS. 3a and 4b. More specifically, FIG. 3b shows the construction of the first four bit positions Q0 through Q3. As shown, these sections include amplifier and transistor circuits which simply transfer signals to bus BI 20 from their respective R/W amplifier circuit under control of microinstruction command signals BICTL1 and BICTL2 from unit 30.

Figure 3C:
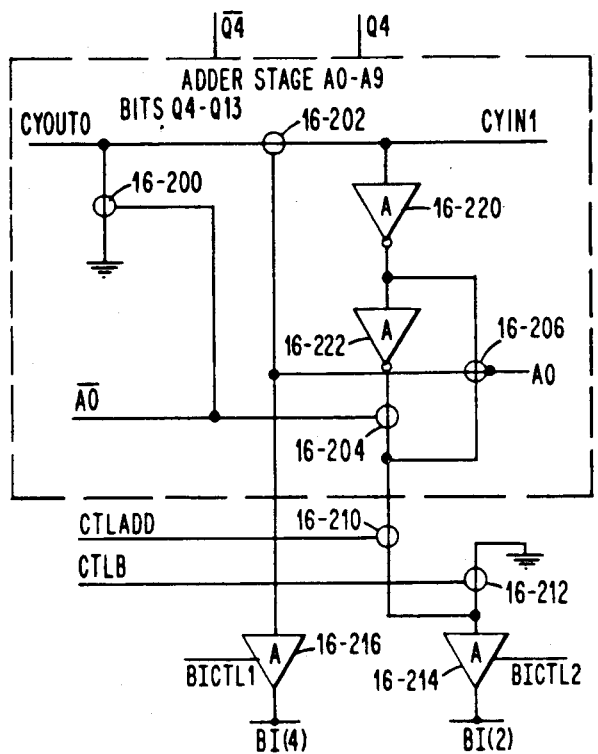
Figure 3D:
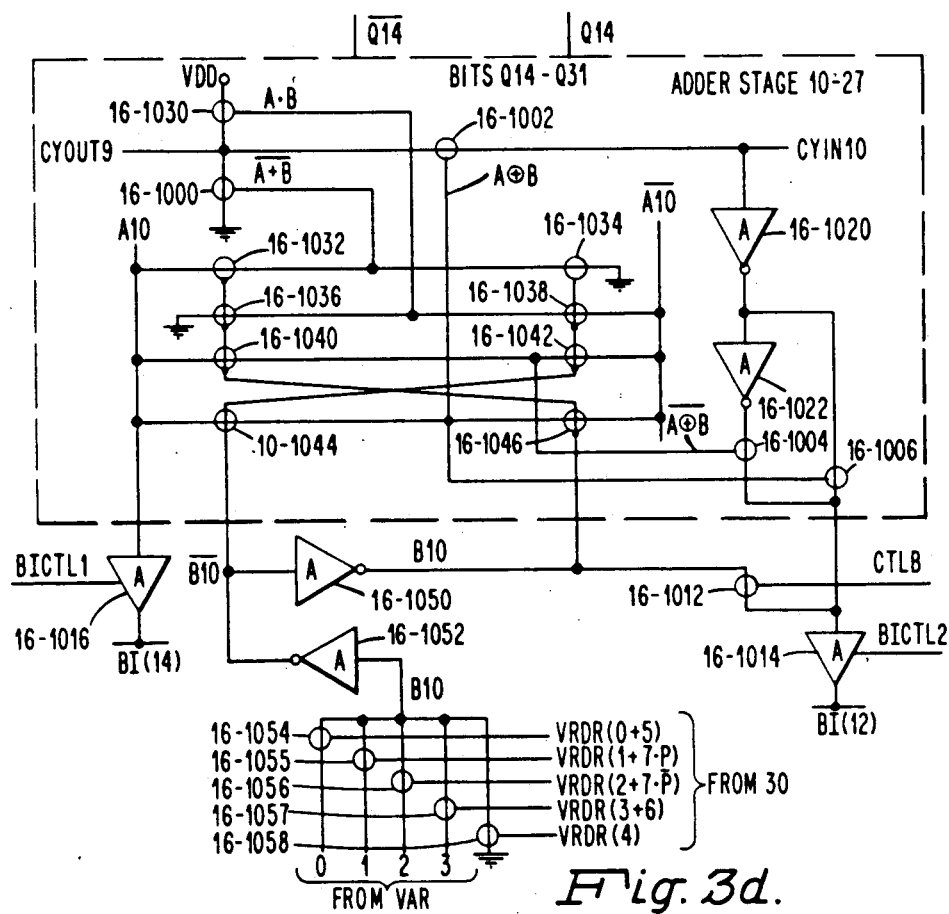

FIG. 3c shows the construction of the first 10 adder stages A0 through A9 for bit positions Q4 through Q13 while FIG. 3d shows the construction of adder stages A10 through A27 for bit positions Q14 through Q31. As seen from these Figures, each of the adder stages 10–27 generate sum and carry propagation signals for a pair of operands A and B while each of the adder stages 0–9 generate sum and carry propagation signals for a single operand, A. Hence, the half adder circuits of FIG. 3c represent a simplified version of the full adder circuits of FIG. 3d.

In greater detail, the representative full adder stage A10 of FIG. 3d, includes a carry propagation section made up of enhancement mode MOSFETS 16-1000, 16-1002 and 16-1030, a logic section made up of MOSFETS 16-1032 through 16-1046 interconnected as NOR, AND, EXNOR and EXOR gates and an exclusive OR sum section which includes inverter circuits 16-1020 and 16-1022 and MOSFETS 16-1004 and 16-1006. The sum bits (A10 or S10) generated by the stage are applied to the bus BI via tristate buffer circuits 16-1016 and 16-1014 as a function of control signals BICTL1 and BICTL2 respectively. Control signal CTLB is used to transfer the selected B operand value to bus BI. A 5:1 multiplexer circuit made up of MOSFETS 16-1054 through 16-1058 are used to select a desired B operand value under control of microinstruction command signals VRDR(0) through VRDR(4) decoded from unit 30. The selected B operand value is applied to the full adder stage and bus BI via inverter circuits 16-1050 and 16-1052 and MOSFET 16-1012 as shown.

FIG. 3c shows the representative adder stage A0 which includes and exclusive OR section made up of inverter circuits 16-220, 16-222 and MOSFETS 16-204 and 16-206 and a carry propagation section made up of MOSFETS 16-200 and 16-202. The sum bits (A0 or S0) are applied to bus BI via tristate buffer circuits 16-216 and 16-214 as a function of command signals BICTL1 and BICTL2 respectively. Control signal CTLADD applied to MOSFET 16-210 is used to transfer the sum signal S0 while control signal CTLB applied to MOSFET 16-212 transfers a ZERO B operand value to bus BI.

Figure 3E:
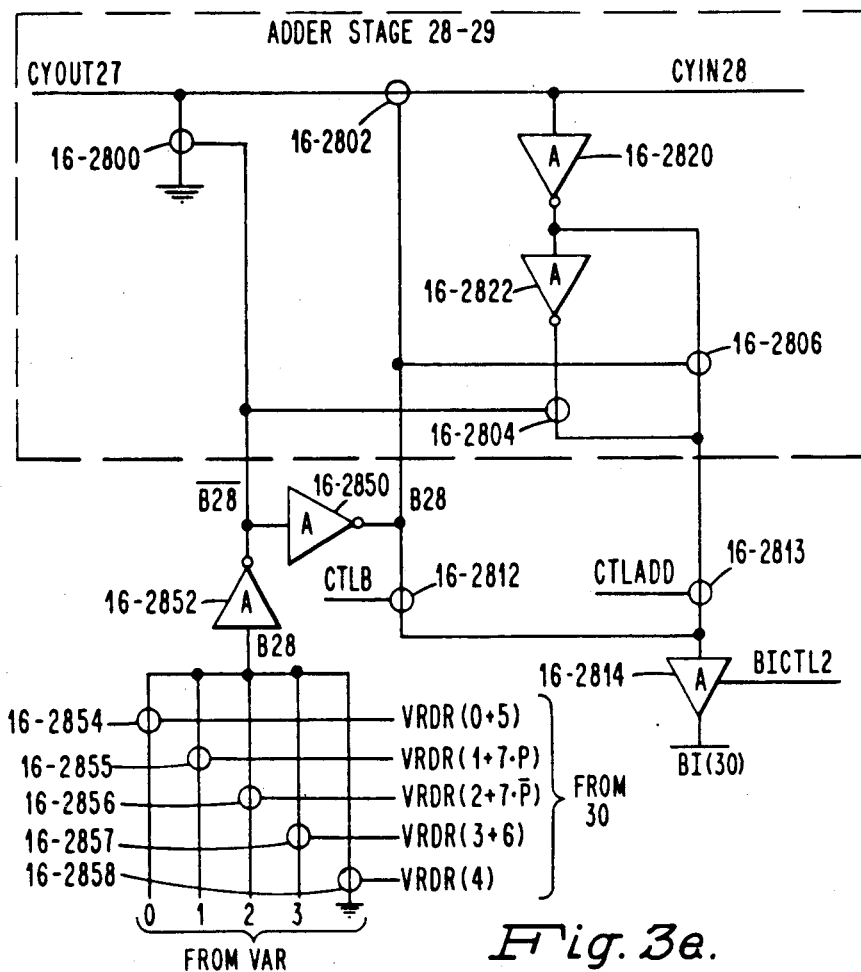
Figure 3:
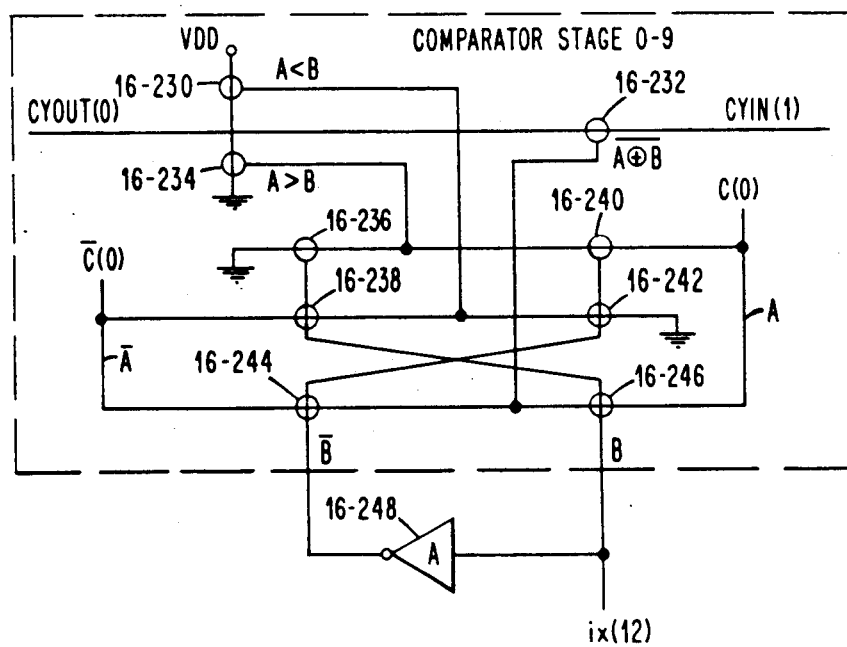

FIG. 3e shows the construction of the last two adder stages A28 and A29 which extend beyond the R/W amplifier circuits as shown in FIG. 4b. Each half adder stage generates sum and carry signals for a single B operand selected by the 5:1 multiplexer circuit. In greater detail, as seen from the Figure, representative adder stage A28 is constructed similar to the half adder stage of FIG. 3c with the addition of a multiplexer circuit similar to that of FIG. 3g for selection of the B operand value. That is, the adder stage includes a carry propagation section made up of enhancement mode MOSFETS 16-2800 and 16-2802 and an exclusive OR section made up of inverter circuits 16-2820 and 16-2822 and MOSFETS 16-2804 and 16-2806. In response to control signal CTLADD applied to MOSFET 16-2813, the sum bit B28 is applied to bus BI via tristate buffer circuit 16-2814 as a function of command signal BICTL2. Control signal CTLB applied to MOSFET 16-2812 is used to transfer the B operand B28 selected by the MOSFETS 16-2854 through 16-2858 applied via inverter circuits 16-2852 and 16-2850 and MOSFET 16-2812 to bus BI.

FIG. 3f shows the construction of the bit comparator sections of security checking circuits 14. As seen from FIG. 4b, first and second groups of bit comparator sections are alternated between adder stages A2 through A11 and A18 through A27 as illustrated by FIG. 3a. The first group of bit comparator sections (C0–C9) receives A operand signals SS0 through SS9 from SDRAM 12-1a and B operand signals ix(12) through ix(21) from VAR register 18. The second group of bit comparator sections (C0–C9), not shown, receives A operand signals GS0 through GS9 from SDRAM 12-1b and B operand signals Iy(22) through Iy(31) from VAR register 18. Each of the bit comparator sections generate a carry propagation signal indicating the result of comparing the pair of A and B operands.

In greater detail, the representative bit comparator section C0 of FIG. 3f includes a carry propagation section made up of enhancement mode MOSFETS 16-230 through 16-234 and a combinatorial logic section made up of MOSFETS 16-236 through 16-246. With the exception of comparator section C9, each comparator section receives a carry-in signal (e.g. CYIN(1)) from the previous section. The B operand value ix(12) is applied to the section via an inverter circuit 16-248.

It may be assumed that similarly constructed comparator circuits together with the required registers are used to perform the various ring checking operations. For the purpose of the present invention, the specific circuits used to construct the various stages of adder 16 and sections of security checking circuits 14 may be considered conventional in design.

Figure 3G:
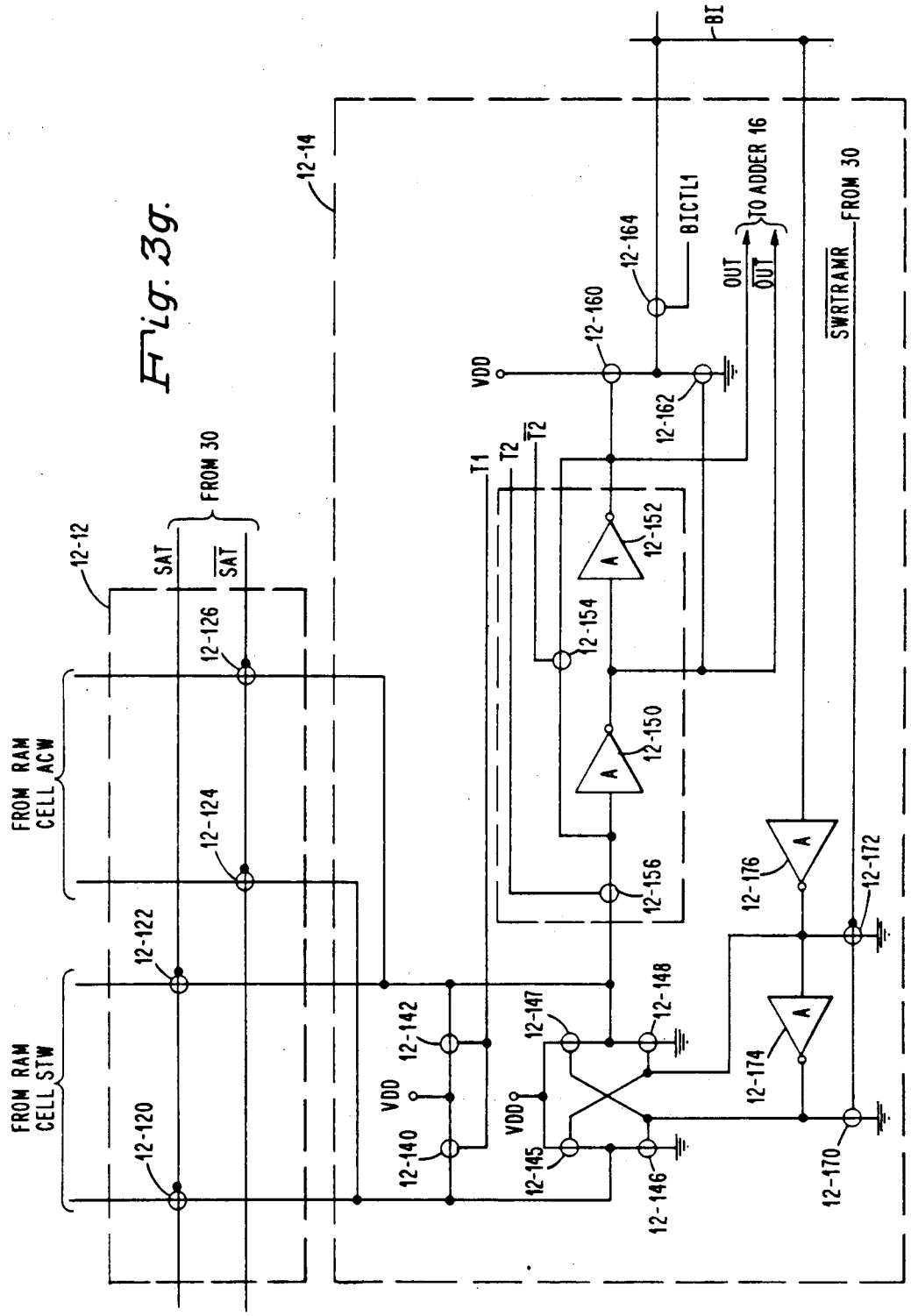

FIG. 3g shows in greater detail, one of the sets of multiplexer circuits and one of the read/write amplifier circuits of block 12-12 and 12-14, respectively. As shown, the multiplexer circuit includes two pairs of enhancement MOSFETS 12-120, 12-122 and 12-124, 12-126. Each pair connects to a different RAM cell and is enabled by a different one of the complementary control signals SAT and $\overline{SAT}$.

As shown, each read/write amplifier circuit includes a pair of precharge MOSFETS 12-140 and 12-142, a write amplifier circuit made up of MOSFETS 12-145 through 12-148. The amplifier circuit further includes a D-latch circuit made up of series connected inverter circuits 12-150 and 12-152 and MOSFETS 12-154 and 12-156 and a tristate buffer circuit which includes MOSFETS 12-160 through 12-164. During time T1 of each cycle of operation, precharge MOSFETS 12-140 and 12-142 precharge the RAM bit lines associated therewith high.

The D-latch circuit is enabled during a read cycle of operation defined by timing signal T2. That is, the amplifier circuit 12-14 is conditioned to read or write as a function of control signal $\overline{SWRTRAMR}$ generated by unit 30. When the control signal is a binary ONE or high, it conditions a pair of MOSFETS 12-170 and 12-172 to place the write amplifier circuit in a tristate condition, essentially removing it from the circuit. Thus, it is unaffected by signals from BI 20 applied to its inputs by a pair of inverter circuits 12-174 and 12-176. At that time, the data signal stored by the D-latch circuit is read out to BI 20 when control signal BICTL1 from unit 30 is forced to a binary ONE or high. Also, at that time, the pair of complementary output signals OUT and $\overline{\text{OUT}}$ are applied to the corresponding stage of adder 16.

The state of control signal SAT determines the selection of information from the STW RAM cell bit position or the ACW RAM cell bit position. When signal SAT is a binary ONE or high, the contents of the STW RAM bit position is applied as an input to the adder 16 stage. Following time T2, when $\overline{\text{T2}}$ is a binary ONE, the contents of the information read from the RAM remains stored in the latch transistors for another complete cycle of operation. This takes place because signal $\overline{\text{T2}}$ conditions MOSFET 12-154 to hold the contents.

As previously mentioned, the RAMs 12-1a and 12-1b of FIG. 2 are functionally organized to store two types of information. One section stores the ACW/STW information while the other section stores the working register information. The STW/ACW eight words are accessed or selected for access by CAM 12-3 in response to a hit. The working register information is selected by the decoder 12-7 in response to microcommand signals from microprogram control unit 30 independently of the CAM selection.

FIGS. 4a and 4b show in greater detail, the assignments and organization of RAMs 12-1a and 12-1b. Referring to FIG. 4a, it is seen that the six work register locations 1-5 are assigned addresses 0-5 and are addressed by microprogram control unit 30 as explained herein. The next two locations 7 and 8 correspond to the descriptor segment base register (DSBR) upper and lower, respectively, and are also addressed by control unit 30.

The DSBR defines the processing unit's address mode and the current process address space. If the first two words of the DSBR are ZERO, then the CPU is in an absolute addressing mode and the address space of the process is limited to what is stored in physical memory. If the first two words of the DSBR are greater than ZERO, the CPU is in a translate address mode and the address space of the process is defined by the descriptor segment table (DSPT) pointed to by the DSBR. The descriptor segment page table locations 17-20 are addressed by control unit 30 and/or the upper bits of the virtual address.

The segment descriptors are stored in a segment table and can occupy up to a thousand entries of 64 bits each. At the time a process is started, the operating system assigns the required system and user segment descriptors to the process. During the execution of the process, additional segments are added as required to the segment table in ascending order to keep the table as compact as possible. The eight most recently used segment descriptors are stored in RAMs 12-1a and 12-1b. More specifically, the bits of the descriptors are divided on the basis of function and are stored in STW and ACW locations. The STW locations 9-16 are addressed by the control unit 30 and a segment CAM hit. The ACW locations 21-28 are addressed by control unit 30 and the segment CAM "hit".

FIG. 4b shows in greater detail the type of information stored within the different bit positions of the different locations of RAMs 12-1a and 12-1b. It also shows the bit slice organization of the adder 16, security unit comparator circuits 14 and RAM cells which results in a simplified layout, increased performance and density.

As seen from the Figure, the descriptor segment base register upper (DSBRU) portion includes the following:

(1) Bit 0 or NS is a new stack indicator. If this bit is set to one, then the new call and return instructions are allowed and traps will cause a frame to be acquired/relinquished in the appropriate stack segment of the new stack. If this bit is set to zero, then the new call and return instructions are not allowed and traps will be processed using trap save areas.

(2) Bit 1 or NI is a new I/O indicator. If this bit is set to one, execution of I/O requires new I/O handling.

(3) Bits 4-23 or PGF0-19 define a page frame number value which correspond to the high order 20 bits of the 30-bit physical address of the descriptor segment table (DSPT).

(4) Bits 24-31 or OFS0-7 define an offset which correspond to the mid-order eight bits of the 30-bit physical address of the descriptor segment table (the remaining low-order two bits of the 30-bit physical address are set to zeros).

The DSBRL consists of the following:

(1). Bits 2-9 or SB0-7 define a stack base value. This 8-bit field and the 2-bit current ring define the segment number of the current stack segment when using new stack functionality.

(2). Bits 24-31 or PS0-9 define a process or segment descriptor table size. This field contains a 10-bit size value that represents the largest valid segment number. If the segment number of a virtual address is greater than the process or segment descriptor table size, then a segment fault is reported.

The Descriptor Segment Page Table (DSPT) entry consists of the following:

(1) Bit 0 is a valid indicator. If the validity bit is set to one, then the descriptor is valid and the remaining bits point to the page frame number of the segment descriptor table.

(2) Bits 1-2 or V, M are used and modified indicators respectively. For this entry, the used and modified must be set to ones.

(3) Bits 4-23 or PGF0-19 define a page frame number value which corresponds to the upper 20 bits of the physical address of the segment descriptor table.

(4) Bits 24-31 or MBZ0-7 are set to zeros and correspond to the lower eight bits of the physical address of the segment descriptor table (the remaining low-order two bits of the 30-bit physical address are set to zeros).

Static Translation Word (STW) consists of the following:

(1) Bit 0 or V is a valid indicator. If the validity bit is set to one, then the segment descriptor is valid and the remaining bits of the segment descriptor are used to perform the virtual to physical address translation and the appropriate access write checks. If valid is set to zero, then the segment descriptor is invalid and a segment fault is reported.

(2) Bit 1 or PR is a privileged indicator If set to one, execution of privileged instructions is allowed only if in ring zero. If set to zero, no privileged instructions are allowed and if one is . encountered, then a privileged instruction fault is reported.

(3) Bits 4-23 PGF0-9 define a page frame number and correspond to the upper 20 bits of the 30-bit physical address of the page descriptor table or the start of the segment in memory.

(4) Bits 24-31 or OF0-7 define an offset value which contains the mid-eight bits of the physical address. If the segment is not paged, this field is not used and must be zero. If the segment is paged, then together with the page number it specifies the start of this segment's page table (the remaining low-order two bits of the 30-bit physical address are set to zeros).

The Access Control Word (ACW) consists of the following:

(1) Bit 0 or P is a paged indicator. If set to one, the segment is paged. The page frame number and offset field define the start of the page table. If set to zero, the segment is not paged. The page frame number defines the start of the non-paged segment in main memory. A non-paged segment must start and end on a page boundary and consist of contiguous page frames.

(2) Bit 1 or E is an execute-permit indicator. Instruction fetches are permitted from this segment only if this indicator is a one and the process is executing in a ring greater than or equal to R1 and less than or equal to R2. Note that when the execute-permit indicator is on and the read-permit indicator is off, the segment is to be treated as an "execute-only" procedure segment An execute-only procedure segment is permitted to reference data within itself in spite of the lack or read permission. However, read permission is denied to all other procedures in other segments. If an attempt to execute an instruction in a segment having no execute permissions then an access fault is reported.

(3) Bits 2-3 or R1 specify the least privileged ring number of the read/write bracket for this segment (0-R1). That is, a procedure running in a ring number from 0-R1 (the write bracket) can write into this segment.

(4) Bits 4-5 or R2 specify the least privileged ring number of the read/execute bracket of this segment (R1-R2). That is, procedure running in a ring number from R1-R2 can read or execute this segment.

(5) Bits 6-15 or SS0-9 are segment size fields which define the size of the segment in pages. If the segment is paged, then the size also defines the size of the page table. If the virtual address is greater than the segment size, then a segment fault is reported.

(6) Bit 16 or C is a compatability indicator. If set to a one, the execute bracket extends from ring 0 to R2 to simulate the behavior of prior access control implementations. If set to a zero, the execute bracket extends from R1 to R2.

(7) Bit 17 or G is a gate indicator. If set, the segment is a gate segment.

(8) Bit 18 or R is a read-permit indicator. Data fetches to this segment by other segments is permitted only if this bit is on and if the process is executing in a ring of equal or greater privilege to R2.

If an attempt is made in violation of read-permission then an access fault is reported.

(9) Bit 19 or W is a write-permit indicator. Data stores to this segment is permitted only if this bit is on and if the processor is executing in a ring of equal or greater privilege to R1.

If an attempt is made in violation of write-permission, then an access fault is reported.

(10) Bits 20-21 or R3 specify the least privileged ring number of the call bracket of this segment (R2-R3).

(11) Bits 22-31 or GS0-9 are gate size fields. If the gate indicator is set to one, then the gate size field specifies the number of words in a gate section of a segment. This field is used during a call instruction.

As mentioned above, the different operations performed by the SDU 10 of FIG. 1 are under the control of microprogrammed control unit 30. These operations are defined by the different microinstructions of FIGS. 6a through 6c. The first type of microinstruction word shown in FIG. 6a defines a static address translation (SAT) operation. As shown, the left most two bit positions (0,1) of this microinstruction word are set to ZEROS. The other fields of the word are not particularly important to the present invention. However, it will be noted that bit positions 6-9 contain information used to control the operation of SDU 10. For example, bit position 6 stores a write bit while bit positions 7-9 store a logical address which can have the values 000 through 111. When the octal logical address has a value of 000, the upper 32 bits of the descriptor segment base register (DSBR) are addressed. When the octal logical address has a value of 001, the lower 32 bits of the DSBR are addressed. The state of write bit 6 establishes whether information is read from or written into the location.

Octal logical address values of 010 through 101 explicitly permit the addressing of descriptor segment page table entry zero (DSPT0) through three (DSPT3). An octal logical address value of 110 specifies the addressing of any one of the four DSPT locations through the subaddress corresponding to the upper two bits of the virtual address field Sx shown in FIG. 6d. An octal logical address value of 111 enables the access of the static translation words (STW's) using the segment CAM "hit" (SCH). This is the main function performed by the static address translation operation which is to use an STW to translate the virtual address to obtain the page table entry for fetching another page in the case of a missing page descriptor.

A second type of microinstruction word used for controlling the operation of SDU 10 is a miscellaneous field called MS2 show in FIG. 6b. The left most two bit positions (01) of this microinstruction word are set to ONES. Bit positions 6-9 provide the same information as did the microinstruction word of FIG. 6a. This microinstruction word reinterprets the octal logical address bits 7-9 to enable different RAM locations within the SDU 10 to be accessed. More specifically, when the octal logical address has the values 000 through 101, work register locations WR0 through WR5 are accessed. The octal logical address value of 111 enables the access of the access control words (ACW's) using the segment CAM hit (SCH).

A third type of microinstruction word shown in FIG. 6c used for controlling the operation of SDU 10 is a microinstruction used to specify a dynamic address translation DAT operation. The left most two bit positions (01) are set to "01". This implies that access to the ACW locations in the SDU RAM 12-1 using the segment CAM "hit" as the subaddress. The other fields of the DAT microinstruction word although not pertinent to an understanding of the present invention are used to control translation (e.g. allow CAM miss), access check (e.g. allow read, write, etc.) and ring checking operations.

A fourth type of microinstruction word shown in FIG. 6d used for loading the virtual address into the VAR register 18 is a miscellaneous field called MSC1. The left most two bit positions (01) of this microinstruction word are set to "10". Bit positions 12-14 control the loading of VAR register 18 as follows: When the octal value as a value "000", the contents remain the same, a value of "001", load VA register from the bus BI while a value of "010∞ decrements the VA contents by one. An octal value of "011" increment the VA contents by one, a value of "100" clear the VA register to ZEROS and a value of "101" also loads the VA register. Octal values of "110" and "111" decrement and increment respectively, the contents by two. The other fields of the microinstruction word are not important to the present invention.

From the above, it is seen that only a few microinstructions are required to perform a number of different operations in parallel which require access to the different types of register locations all within the single SDU RAM 12-1.

DESCRIPTION OF OPERATION

Figure 5:
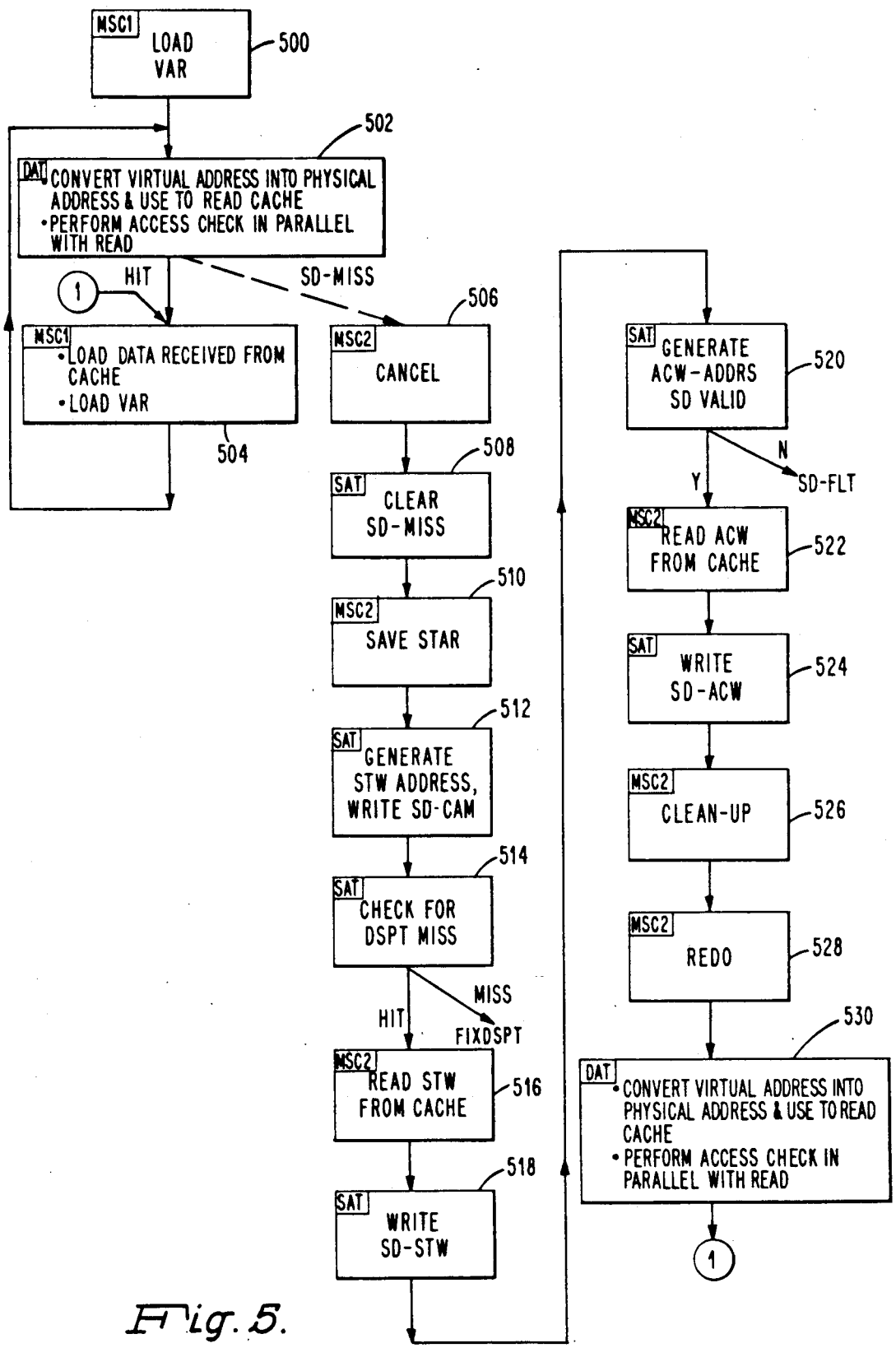
FIG. 5 is a flow diagram used in explaining the operation of the SDU of FIG. 1.

The operation of the SDU 10 will now be described with reference to the flow diagram of FIG. 5. FIG. 5 illustrates a normal read memory sequence. As shown, the sequence includes performing the operations designated by boxes 500 through 504. These include loading the VAR register 18, converting the virtual address into a physical address, performing access checking, loading the data received from cache and loading VAR 18 with the data. That is, in greater detail, the virtual address having the format of FIG. 6e is loaded from the bus BI into VAR register 18 under the control of a first microinstruction word formatted as the MSC1 microinstruction shown in FIG. 6d. This address is applied to the SDU10 as well as to a page descriptor unit (PDU), not shown. The PDU performs the page translation of the 20-bit virtual address into a 20-bit physical address in parallel with the SDU operations.

Since the operation of the PDU is not pertinent to the understanding of the present invention, it is not described herein. However, for further information, reference may be made to the related patent application titled, "High Speed High Density Dynamic Address Translator".

As seen from FIG. 5, under the control of a second microinstruction word formatted as the DAT microinstruction of FIG. 6c, the operations of block 502 are carried out. The segment number of the virtual address is applied to CAM 12-3. In the case of an identical comparison, one of the SDU eight hit signals becomes a binary ONE. Assuming that the physical address is sent to cache and during the cache read operation, the SDU 10 performs the necessary access checks. That is, the DAT microinstruction word causes the SDU RAM 12-1 to access the ACW portion subaddressed by the hit signal SCH. The ACW portion of SDU RAM 12-1 is used by the security checking comparator circuits 14 of the VMMU, under control of the DAT microinstruction word 6c, to perform ring selection, access checking and ring reduction.

The ring selection is performed by ring checking logic circuits included within security checking circuits 14 using the ACW's R1, R2 and R3 values along with the contents of a current ring register (RCR), an effective ring register (REF) and the value of the ring number RN) in the virtual address (VA) to form a value (RNG). Under control of the DAT microinstruction ring generation control field bits 12-14, security is monitored as follows.

The security checking circuits 14 use ACW bit positions 1 through 5 and bit position 16 to perform the execute permissions and ring bracket check. For example, if the comparison circuits 14 determine that field RN of FIG. 6e is greater than ACW field R2 (bits 4-5) or if ACW field R1 (bits 2-3) is greater than RN and ACW compatibility bit 16 is not on or execute permit indicator bit 18 is not on and microinstruction word bits 6-8 are equal to an octal 1 or 4, an access fault is reported.

ACW bit positions 4-5 and ACW bit position 18 are used by circuits 14 to perform the read permissions and ring bracket check. For example, if the circuits 14 detect that the value (REFF), defined by the greater of values RN and REF, is greater than ACW field R2 (bits 4-5) or read permit indicator bit 18 is not on and microinstruction word bits 6-8 are equal to an octal 2 or 7, an access fault is reported.

Also, the circuits 14 use ACW bit positions 2-3 and bit position 19 to perform the write permissions and ring bracket check. For example, if the circuits detect that REFF is greater than ACW field R1 (bits 2-3) or the write permit indicator bit 19 is not on and microinstruction word bits 6-8 are equal to an octal 4 or 7, an access fault is reported.

The security checking circuits 14 use ACW bit positions 2-5, 20-21 and bit position 17 to perform the gate permissions and ring bracket check. For example, if the circuits 14 detect that field R1 is greater than REF and the microinstruction word bits 6-8 are equal to an octal 5, a gate fault is reported. Lastly, circuits 14 use ACW bit positions 6-15 to perform a segment size check. For example, if the circuits 14 detect that the middle bits 12-21 of the virtual address are greater than segment size bits 6-15, then a size fault is reported.

At the completion of the access checking, under the control of another MSC1 microinstruction word, the data specified by the physical address received from cache is loaded into the appropriate CPU registers and a next virtual address is loaded into VAR register 18. The sequence of operations of blocks 502 and 504 wherein the loop of MSC1 and DAT microinstruction words are repeatedly accessed continues as long as hits are detected. When a descriptor miss condition is detected, this causes SDU 10 under control of control unit 30 to perform the sequence of operations designated by blocks 506 through 530 required for fetching a missing segment descriptor. The occurrence of a page descriptor miss also interrupts the sequence loop and causes a sequence of operations similar to those shown in blocks 506 through 530 to be performed for fetching a missing page descriptor from page tables stored in cache or memory. The operation of the PDU will be described only to the extent that it utilizes information accessed from SDU 10.

In greater detail, the segment number of the virtual address having the format of FIG. 6e is applied to CAM 12-3. In the absence of an identical comparison, all of the eight hit signals remain binary ZEROS which results in the generation of a miss condition detected by CAM 12-3 (all ZEROS detected). Since it is assumed that there was an error indicating that the requested data would not be fetched from cache, microprogram control unit 30 via a MSC2 microinstruction word performs a cancel operation which eliminates or cancels the step that was going to be executed. The control unit 30 then cycles to the first location of a missing handler routine.

As indicated by block 508, the first operation performed is to clear the miss condition. This is done under the control of a SAT microinstruction word which resets the appropriate bit position within a syndrome register used to store off error conditions in addition to other status information. Also, under the control of another MSC2 microinstruction word, information pertaining to a write operation is stored in a temporary so-called sta' egister. This information permits the system to redo a write operation if the particular operation turns out to be a write operation.

Upon the completion of the housekeeping operations of blocks 506, 508 and 510, SDU 10 begins the first step in the missing segment descriptor sequence. As seen from block 512, the SDU 10, under control of another SAT microinstruction word from microprogram control unit 30, generates the address of the STW and writes the CAM 12-3. In order to generate the required address, an appropriate one of the four DSPT word locations of SDU RAM 12-1 is accessed in response to the SAT microinstruction word. The contents of the DSPT location specified by bits 7-9 of the SAT microinstruction word are read out from RAM 12-1 to adder 16.

During the next cycle, under the control of a further SAT microinstruction word, as indicated by block 514, the DSPT word is checked for a miss. That is, the appropriate bit (i.e., bit 0) is examined to determine whether or not there was a miss in the DSPT word (i.e., not present in SDU RAM 12-1). If there was a miss, the microprogram control unit 30 causes a branch to a subroutine FIX DSPT used to fix up the DSPT miss. This involves that use of SDU 10 and, in particular, access to the DSBR word locations to generate the address for fetching the next page from memory.

Assuming that there was a hit, during a next cycle as shown in block 516, the generated address which is combination of a portion of the virtual address in VAR register 18 and the DSPT word is used to access the SDW from cache under control of another MSC2 microinstruction word. The SDW is one of the entries in the segment table that is associated with the virtual address segment number.

The requested value is brought into the SDU 10 via bus BI 20, and the first half of the segment descriptor word corresponding to the STW is written into the SDU RAM 12-1. In greater detail, during the next cycle as indicated by block 518, a SAT microinstruction word having write register bit 6 set to a binary ONE and address bits 7-9 set to "111", causes the STW value to be written into one of the eight STW locations of SDU RAM 12-1 defined by the segment CAM hit. That is, this sequence was initially entered because of a segment CAM miss. The virtual address contents of VAR 18 was written into segment CAM 12-5 before the segment descriptor word was received from cache. At this time, the STW bits of the segment descriptor word was written into the RAM location pointed to by the segment CAM hit. The SAT microinstruction word generates signal SAT which conditions the multiplexer circuits 12-12 of FIG. 2 to apply signals from R/W amplifiers 12-14 only to the STW bit positions of RAMs 12-1a and 12-1b. The state of bit position 6 of the SAT microinstruction word forces signal $\overline{\text{SWRTRAMR}}$ to a binary ZERO, causing R/W amplifier 12-14 of FIG. 3g to apply complementary signals to each STW bit location.

As indicated by block 520, during the time that the second half of the address is being generated (i.e., the second double word address of the segment descriptor stored in cache), the SDU 10, under the control of a next SAT microinstruction word, checks the state of the left most bit (bit 0) of the segment descriptor word to determine if it was a valid segment descriptor. If it is not a binary ONE indicating that it is invalid, the microprogram control unit 30 branches to a segment descriptor fault routine SD-FLT as indicated by block 520. This routine stores off information in the SDU working register locations as required for handling the fault.

Assuming that the segment descriptor is valid, another read operation is performed as indicated by block 522 under the control of a MSC2 microinstruction word. At this time, the ACW is fetched and written into the SDU RAM 12-1. That is, as indicated by block 524, this operation is carried out by a MS2 microinstruction word in which the left most two bits are 11, write register bit 6 is a binary ONE and bits 7-9 are "111". The result is that the ACW is written into the location specified by bits 7-9 and the segment CAM hit as indicated by block 524. That is, at this time, signal SAT is a binary ZERO. This conditions the multiplexer circuits 12-12 to apply signals only to the ACW bit positions. The state of bit position 6 again forces signal $\overline{\text{SWRTRAMR}}$ to a binary ZERO causing each R/W amplifier to apply complementary signals to each ACW bit location.

As seen from block 526, a further clean-up step is performed under the control of another MSC2 microinstruction word before leaving the sequence in addition to the redo operation of block 528. Since the SDU 10 was performing a read operation, this operation will result in converting the virtual address into a physical address for reading cache and performing access checking in parallel with the cache read operation as indicated by block 530.

Next, the sequence returns to the original loop. Since the missing information has been replaced, a hit will be generated and the received data will be loaded along with loading VAR register 18 with the next virtual address to be translated. As previously mentioned, SDU 10 will remain in this loop until the occurrence of either a segment or page descriptor miss. In the case of a missing page descriptor, a page table word PTW entry address must be generated as part of the sequence for a paged segment. That is, the ACW contains a bit indicating whether the segment is paged or not. Based upon the state of this bit, SDU 10 performs those operations for paged and unpaged segments. This operation is done in response to a SAT microinstruction word in which write register bit 6 is a binary ZERO and bits 7-9 are "111". This enables the STW bits of the SDW to be read out from SDU RAM 12-1. The STW contains the base address and the offset of the PTW in the page table stored in cache. The virtual address bits in VAR register 18 are used to indicate the particular page table entry. Using this information, the resulting address is calculated in adder 16 and stored in the star register where it is subsequently used to fetch the PTW from cache. In the case of an unpaged segment, under the control of a different SAT microinstruction word, adder 16 generates the page descriptor address from the STW bits without having to access cache. Thus, the ACW storage provides adder flexibility in carrying out address translation operations involving paged and unpaged segments.

From the above, it is seen how the organization of SDU 10 according to the present invention enables a variety of operations to be performed by accessing a number of different types of register locations within a single RAM under the control of very few microinstruction commands.

It will be obvious to those skilled in the art that many changes may be made to the preferred embodiment of the present invention. For example, the word size, number of locations and types of information and control may be changed  desired.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A segment descriptor unit for performing translation operations on each word received by said unit, said unit comprising:

a single random access memory (RAM) having a plurality of storage locations, each location having a plurality of bit locations, first and second groups of bit locations of each of a first number of said plurality of storage locations being positioned relative to each other in a predetermined manner for storing different types of descriptor information accessible only during first and second types of translation operations respectively;

a content addressable memory (CAM) having a plurality of storage locations for storing information required for translating a corresponding number of segment descriptor words and a plurality of outputs for generating hit signals indicating the results of comparing said each word to be translated with said information stored in said plurality of storage locations, said outputs being coupled to said RAM; and microprogrammed control means coupled to said RAM and to said CAM, said control means including a control store having a plurality of locations for storing a plurality of different types of microinstructions words, said control means in response to receiving said each word to be translated, reading out a first one of said different types of microinstruction words for generating a first group of signals for enabling a first device to perform operations for carrying out a first type of translation operation and said control means in response to said hit signals indicative of a miss condition reading out a second one of said different types of microinstruction words for generating a second group of signals for enabling a second device to generate an address from said information stored in said second group of locations for accessing missing data for completing a second type of translation operation on said received word concurrently with said first type of operating during different cycles of operation.

2. The segment descriptor unit of claim 1 wherein said unit further includes decoder means coupled to said RAM and to said microprogrammed control means, said decoder means being conditioned by a third group of signals from said microprogrammed control means to access a designated one of a second number of said plurality of locations of said RAM used for storing working register information used during the performance of said first and second types of translation operations.

3. The segment descriptor unit of claim 2 wherein said unit further includes a register for storing each word required to be translated, said register being coupled to said decoder means, said decoder means being conditioned by signals from said register and signals from said second group of signals to access a designated one of a third number of said storage locations for generating an address for fetching information to be stored in said second group of bit locations of one of said first number of locations which caused said CAM to generate hit signals indicating a miss condition.

4. The segment descriptor unit of claim 1 wherein said first device corresponds to security checking circuits for verifying memory access based upon the state of said information stored in said first group of bit locations.

5. The segment descriptor unit of claim 1 wherein said unit is of VLSI chip construction and wherein said first group of bit locations and said second group of bit locations of said RAM are alternately positioned so that only that information necessary for performing said first and second translation operations by said first and second devices are accessible during said different cycles of operation defined by said first and second groups of signals so as to reduce the amount of chip space in correspondence with the number of bits of information being operated on by said devices.

6. The segment descriptor unit of claim 5 wherein said first device includes a plurality of comparator sections and said second device includes a number of adder stages, each of said number of said adder stages being positioned between said comparator sections so as to minimize chip space requirements.

7. The segment descriptor unit of claim 5 wherein said RAM further includes a plurality of read/write amplifier circuits and a plurality of multiplexer circuits, each plurality corresponding in number to said first group of bit locations, said amplifier circuits and said multiplexer circuits being arranged in columns aligned with corresponding pairs of bit positions from said first and second groups of RAM bit locations, said multiplexer circuits being coupled to said microprogrammed control means, said multiplexer circuits in response to signals from said control means selecting which bit positions from said pairs of bit positions are to be connected to corresponding ones of said read/write amplifier circuits during a RAM read or write cycle of operation.

8. A segment descriptor unit for performing translation operations on each virtual address word received by said unit, said unit comprising:

a virtual address register for storing each virtual address word required to be translated;

a random access memory (RAM) having a plurality of segment descriptor word (SDW) locations, each location being divided into a number of groups of bit positions and positioned relative to each other in a predetermined manner, a different one of said number of groups storing segment and page descriptor information only accessible during a corresponding number of different types of translation operations;

a content addressable memory (CAM) having a plurality of storage locations for storing information for translating a corresponding number of segment descriptor words and a plurality of outputs for generating hit signals indicating the results of comparing said each word to be translated with the information stored in said CAM, said outputs being connected to said RAM;

microprogrammed control means coupled to said RAM and to said CAM, said control means generating first and second pluralities of signals for accessing first and second ones of said number of groups respectively of one of said SDW locations of said RAM designated by said CAM hit signals used for concurrently performing first and second types of translation operations involving segmented and paged data; and, decoder means coupled to said RAM, to said virtual address register and to said microprogrammed control means, said decoder means being conditioned by another group of signals from said microprogrammed control means to access a designated one of a second number of said plurality of locations used for storing working register information used during the concurrent performance of said first and second types of translation operations, and said decoder means being conditioned by signals from said register and signals from said second group of signals to access a designated one of a third number of said storage locations for generating an address for fetching information to be stored in said second group of bit locations of one of said first number of locations which caused said CAM to generate hit signals indicating a miss condition.

9. The segment descriptor unit of claim 8 wherein said microprogrammed control means includes a control store having a plurality of locations for storing a plurality of different types of microinstruction words, said control means in response to receiving said each word to be translated, reading out a first one of said different types of microinstruction words for generating said first group of signals for enabling a first device to perform operations for carrying out said first type of translation operation and said control means in response to said hit signals indicative of a miss condition reading out a second one of said different types of microinstruction words for generating said second group of signals for enabling a second device to perform operations for concurrently carrying out said second type of translation operation.

10. The segment descriptor unit of claim 9 wherein said first device corresponds to security checking circuits for verifying memory access based upon the state of said information stored in said first group of bit locations.

11. The segment descriptor unit of claim 9 wherein said second device is an adder for generating an address from said information stored in said second group of locations for accessing missing data required for completing the translation of said received word.

12. The segment descriptor unit of claim 8 wherein said unit is of VLSI chip construction and wherein said first group of bit locations and said second group of bit locations of said RAM are alternatively positioned so that only that information necessary for performing said first and second translation operations by said first and second devices are accessible at different cycles of operation defined by said first and second groups of signals, said arrangement reducing the amount of chip space in conformance with the number of bits of information being operated on by said devices.

13. The segment descriptor unit of claim 12 wherein said first device includes a plurality of comparator sections and said second device includes a number of adder stages, each of said number of said adder stages being positioned between said comparator sections so as to minimize chip space requirements.

14. The segment descriptor unit of claim 12 wherein said RAM further includes a plurality of read/write amplifier circuits and a plurality of multiplexer circuits, each plurality corresponding in number to said first group of bit locations, said amplifier circuits and said multiplexer circuits being arranged in columns aligned with corresponding pairs of bit positions of said first and second groups of RAM bit locations, said multiplexer circuits being coupled to said microprogrammed control means, said multiplexer circuits in response to signals from said control means selecting which bit positions from said pairs of bit positions are to be connected to corresponding ones of said read/write amplifier circuits during a RAM read or write cycle of operation.

15. A VSLI segment descriptor unit for performing translation operations on each virtual address word received by said unit, said unit comprising:

a random access memory (RAM) being equally divided into a pair of sections, each section having a plurality of bit cells arranged in rows and columns, and a plurality of word lines, each word line being connected to the bit cells of a different row and to a plurality of bit lines, pairs of said bit lines being connected to the bit cells of a different column, first and second groups of alternate positioned bit cells of each of a first number of rows storing information pertaining to first and second different types of address translation operations;

a content addressable memory (CAM) having an array for storing information for translating a corresponding number of segment descriptor words, said array containing a plurality of bit cells organized into a plurality of rows and columns and a plurality of hit lines, each of said bit cells within each different column being connected in common to a different one for said hit lines, said CAM being positioned between said pair of RAM sections so that a different one for said hit lines couples to a different one of said word lines of a first number of rows in each RAM section associated with the same row of bit cells, said CAM generating hit signals for indicating a match from comparing said each virtual address word and said information stored in said array;

microprogrammed control means coupled to said bit lines of each of said RAM sections, said control means generating signals for specifying said first and second different types of address translation operations during different cycles of operation, said signals selecting said bit lines of said first and second groups of bit cells of one of said first number of rows within said RAM sections designated by said hit signals applied to said CAM hit lines for read out of said information from one of said first and second groups of bit cells as a function of said type of address translation operation being performed during one of said different cycles of operation; and, decoder means coupled to said microprogrammed control means and to a second number of said word lines of a second number of rows in said each RAM section associated with the same row of bit cells, said decoder means being conditioned by signals from said control means to access said first and second groups of bit cells of one of said second number of rows within said each RAM section for storing information used during the performance of said first and second types of translation operations.

16. The segment descriptor unit of claim 15 wherein said information stored in said first group of bit cells of said second number of rows of said each RAM section includes addresses for fetching segment descript n- formation indicated by said hit signals as being not stored in said CAM.

17. The segment descriptor units of claim 15 wherein said second group of bit cells of said second number of rows are available as working register storage usable during said first and second translation operations.

18. A VLSI segment descriptor unit for performing translation operations on each virtual address word received by said unit, said unit comprising:
   a random access memory (RAM) being equally divided into a pair of sections, each section having a plurality of bit cells arranged in rows and columns, and a plurality of word lines, each word line being connected to the bit cells of a different row and to a plurality of bit lines, pairs of said bit lines being connected to the bit cells of a different column, first and second groups of alternate positioned bit cells of each of a first number of rows storing information pertaining to first and second different types of address translation operations;
   a content addressable memory (CAM) having an array for storing information for translating a corresponding number of segment descriptor words, said array containing a plurality of bit cells organized into a plurality of rows and columns and a plurality of hit lines, each of said bit cells within each different column being connected in common to a different one of said hit lines, said CAM being positioned between said pair of RAM sections so that a different one of said hit lines couples to a different one of said word lines of a first number of rows in each RAM section associated with the same row of bit cells, said CAM generating hit signals for indicating a match from comparing said each virtual address word and said information stored in said array;
   microprogrammed control means coupled to said bit lines of each of said RAM sections, said control means generating signals for specifying said first and second different types of address translation operations during different cycles of operation, said signals selecting said bit lines of said first and second groups of bit cells of one of said first number of rows within said RAM sections designated by said hit signals applied to said CAM hit lines for read out of said information from one of said first and second groups of bit cells as a function of said type of address translation operation being performed during one of said different cycles of operation; and,
   said control means including a control store having a plurality of locations for storing a plurality of different types of microinstruction words, said control means in response to receiving said each word to be translated, reading out a first one of said different types of microinstruction words for generating first ones of said signals for enabling a first device to perform operations for carrying out said first type of translation operation and said control means in response to said hit signals indicative of a miss condition reading out a second one of said different types of microinstruction words for generating second ones of said signals for enabling a second device to perform operations for carrying out said second type of translation operation.

19. The segment descriptor unit of claim 18 wherein said first device corresponds to security checking circuits for verifying memory access based upon the state of said information stored in said first group of bit cells.

20. The segment descriptor unit of claim 18 wherein said second device is an adder for generating an address from said information stored in said second group of bit cells for accessing missing data required for completing the translation of said virtual address word.

21. The segment descriptor unit of claim 18 wherein said first device includes a plurality of comparator sections and said second device includes a number of adder stages, each of said number of said adder stages being positioned between said comparator sections so as to minimize chip space requirements.

22. The segment descriptor unit of claim 18 wherein each of said RAM sections further includes a plurality of read/write amplifier circuits and a plurality of multiplexer circuits, each plurality corresponding in number to said first group of bit locations, said amplifier circuits and said multiplexer circuits being arranged in columns aligned with corresponding pairs of columns of said first and second groups of RAM bit cells, said multiplexer circuits being coupled in series with said multiplexer circuits in response to signals from said control means selecting which column of said pairs of columns of bit cells are to be connected to corresponding ones of said read/write amplifier circuits during a RAM read or write cycle of operation.

* * * * *